T. C. DU-SO.
FRICTION TRANSMISSION GEAR.
APPLICATION FILED DEC. 23, 1914.

1,177,401.

Patented Mar. 28, 1916.
3 SHEETS—SHEET 3.

UNITED STATES PATENT OFFICE.

THEODORE C. DU-SO, OF IDAHO SPRINGS, COLORADO.

FRICTION TRANSMISSION-GEAR.

1,177,401. Specification of Letters Patent. Patented Mar. 28, 1916.

Application filed December 23, 1914. Serial No. 878,752.

*To all whom it may concern:*

Be it known that I, THEODORE C. DU-SO, a citizen of the United States, residing at Idaho Springs, in the county of Clear Creek and State of Colorado, have invented certain new and useful Improvements in Friction Transmission-Gears; and I do hereby declare the following to be a full, clear, and exact description of the invention, such as will enable others skilled in the art to which it appertains to make and use the same.

This invention relates to friction transmission gears, designed more particularly for use in driving auto vehicles, but capable of uses in many other relations, and one of the principal objects of the invention is to provide a variable friction gearing which shall be simple in construction, reliable in operation, which shall be light in weight and which may be manufactured at a comparatively low cost.

Another object of the invention is to provide a friction transmission gear which will operate smoothly, which will be strong and durable and which will be provided with means for taking up wear, and which cannot readily get out of order.

Figure 1:
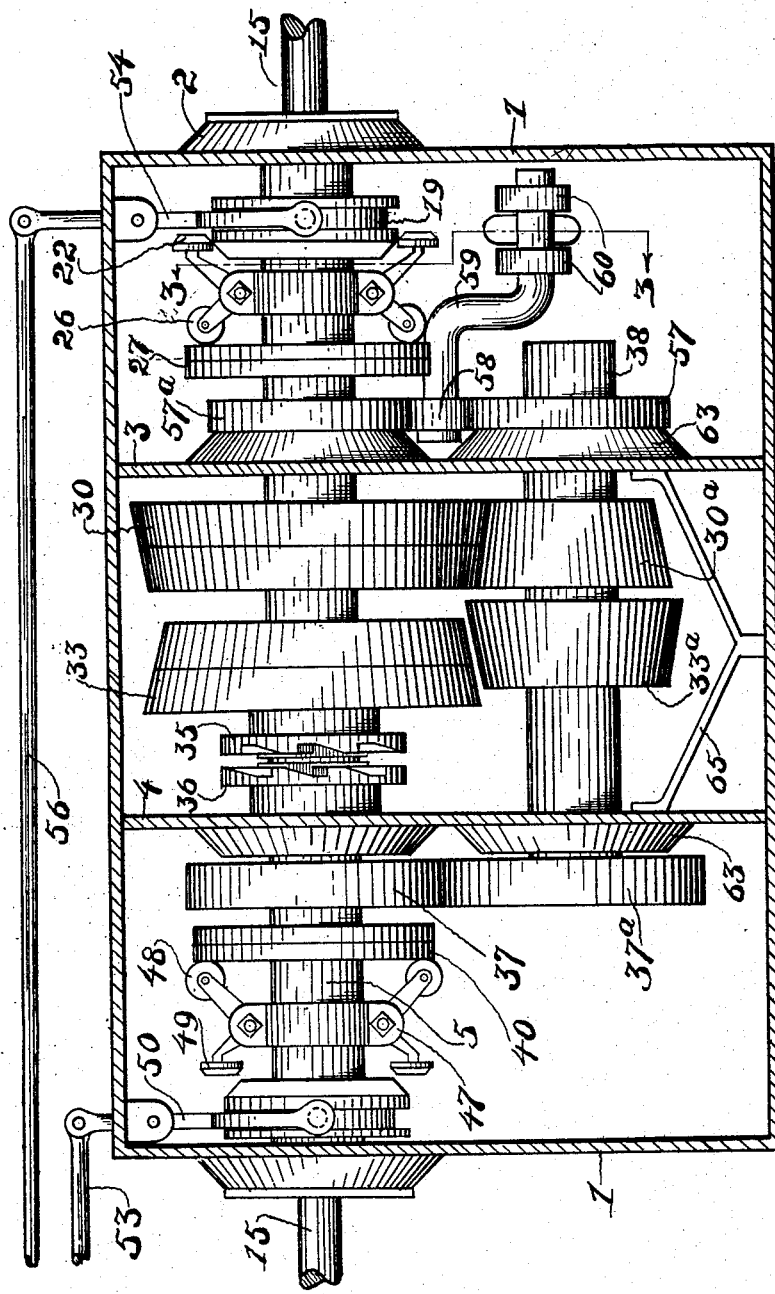
Figure 2:
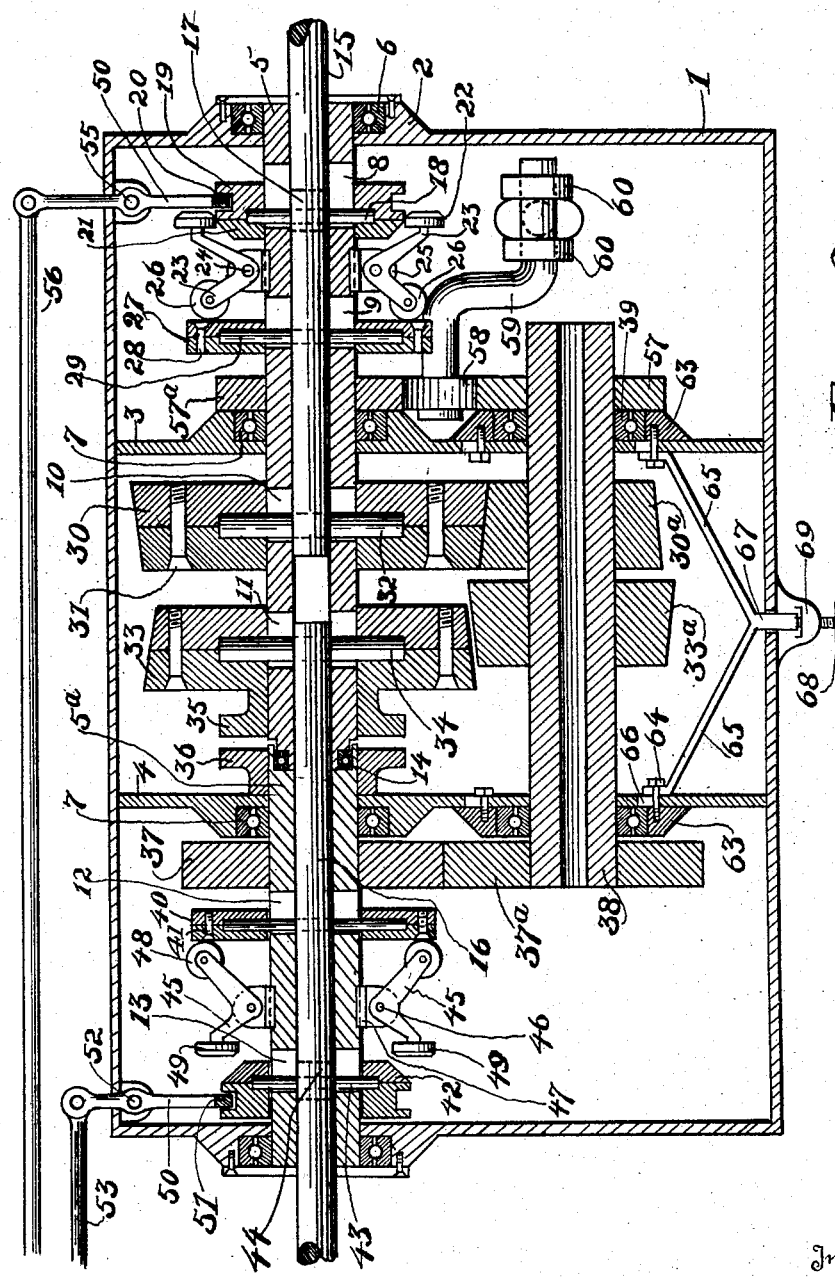
Figure 3:
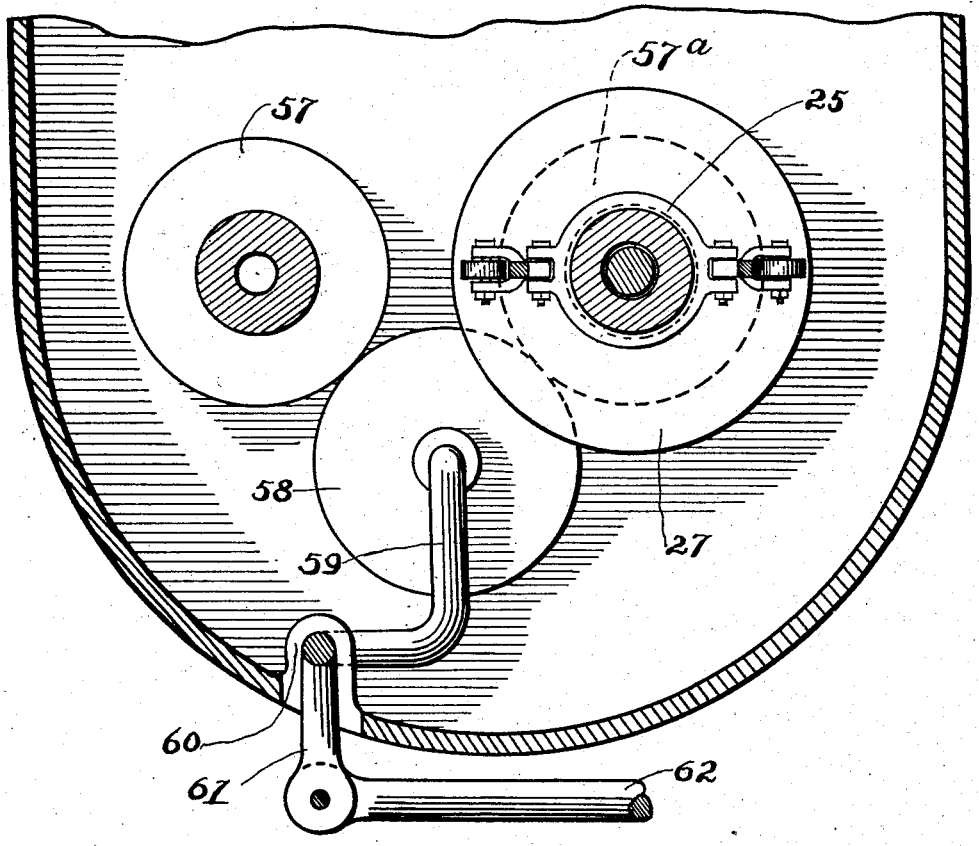

These and other objects may be attained by means of the construction illustrated in the accompanying drawings, in which, Figure 1 is a horizontal sectional view of the gear casing and showing the gear in plan, Fig. 2 is a horizontal sectional view taken through the shaft and operative parts of the gear, and Fig. 3 is a sectional view taken on line 3—3 of Fig. 1, looking in the direction indicated by the arrow.

Referring to the drawings, the numeral 1 designates the gear casing, and 2 are the bosses or enlargements at the ends of the casing to form bearings for the shaft. Within the casing 1 are partitions 3 and 4. The shafts 5 and $5^a$ are mounted in ball bearings 6 at the ends of the casing and in similar ball bearings 7 at the partitions 3 and 4. The drive shaft 5 is provided with alining slots 8, 9, 10, and 11 and the driven shaft $5^a$ is provided with similar slots 12 and 13. The shafts 5 and $5^a$ are mounted in alinement with each other and ball bearings 14 are interposed between the adjacent ends thereof. The shafts 5 and $5^a$ are hollow and extending through the bore of said shafts are rods 15 and 16, power being applied to the drive shaft 5 through the medium of the rod 15. The rod 15 is provided with a slot 17, in line with the slot 8, and extending through the rod 15 at the slot 17 and through the slot 8 in the shaft 5 is a pin 18 which engages a cam 19, said cam having a groove to accommodate the shifting fork 20 and a cam 21 carrying an inclined or irregular periphery to be engaged by a roller 22. The roller 22 is mounted upon an elbow lever 23 pivoted at 24 to a collar 25 having projected spaced lugs between which the lever 23 is pivoted. It will be seen upon reference to Figs. 1 and 3, that there are two elbow levers 23, one upon each side of the shaft 5, and each of said levers carries a roller 26 which bear against a plate 27 formed in two sections connected together by bolts 28 with a pin 29 between them. The pin 29 extends through the rod 15 and through the slot 9 in the shaft 5.

A low speed beveled friction wheel 30, comprising two sections secured together by means of bolts 31, is mounted on the shaft and a pin 32 extends through the rod 15 and through the slot 10 in the shaft 5 and engages the friction wheel intermediate the two members or sections. An intermediate friction gear wheel 33, also formed of two sections for intermediate speed is mounted upon the shaft and provided with a pin 34 which extends through the rod 16 and through the slot 11. Formed integral with the friction wheel 33 is a clutch member 35. The coacting clutch member 36 is mounted on the shaft $5^a$, and is keyed or otherwise fixed thereon.

A friction wheel 37 is fixed to the shaft $5^a$ and is in constant rotation and contact with the friction wheel $37^a$ mounted on the counter-shaft 38. The counter-shaft 38 is mounted in ball bearings 39 formed in the partitions 3 and 4, and mounted on said counter-shaft are beveled friction wheels $30^a$ to coact with the wheel 30 and the friction wheel $33^a$ to coact with friction wheel 33.

A circular plate 40 similar to the plate 27 has connected to it a pin 41 which extends through the slot 12 in the shaft $5^a$ and through a hole in the rod section 16. A cam 42, similar to the cam 21 is mounted on the shaft 5ª, and is connected by means of the pin 43 through a slot 44 to the rod 16. An elbow lever 45 pivoted at 46, one upon each side of a collar 47 mounted on the shaft 5ª carries a roller 48 to bear against the plate 40 and a roller 49 to roll upon the cam 42. A shifting lever 50 provided with a fork 51 to engage the cam 42 is pivoted at 52 to a lug inside the casing and is provided with a connecting bar 53 which leads to a foot pedal in easy reach of the driver. The fork 20 is connected to a lever 54 pivoted at 55 and extending out through the casing and connected to said lever is a rod 56 which leads to a hand lever.

A reversing device consists of a friction wheel 57 on the counter-shaft 38 and a friction wheel 57ª on the shaft 5, and an intermediate friction wheel 58 which may be thrown into and out of contact with the wheels 57 and 57ª by means of a crank 59 mounted in bearings 60. A link 61 connected to a rod 62, leads to the driver's seat.

For adjusting the friction wheels to take up wear, the ball bearing members 63 are connected by means of bolts 64 to the diverging bars 65. The bolts 64 extend through slots 66 in the partitions 3 and 4 and the bars 65 are united in the center by a stud or projection 67 which extends through the casing 1. An adjusting screw 68 extends through a bearing 69 and may be adjusted in contact with the projection 67 for forcing the friction wheel into more intimate contact.

The operation of the invention may be briefly described as follows: For running at low speed, the lever 56 is operated to shift the cam 21 to throw the wheels 30 and 30ª into contact. For an intermediate speed, the cam 42 is moved to throw the intermediate gears 33 and 33ª into contact, and for high speed the clutch members 35 and 36 are engaged. When it is desired to reverse the rotation the intermediate friction wheel is thrown into contact with the wheels 57 and 57ª, as will be understood.

From the foregoing it will be obvious that a variable friction gear made in accordance with this invention is very simple in construction, is reliable and efficient in use, can be manufactured at low cost, is comparatively light in weight, is compact in form, and the wear can be readily taken up. The advantage of the use of friction gear is obvious, there is less wear, there is a more smooth running, and less jar in increasing speed, while back lash and slipping teeth are entirely obviated.

Various changes may be made in the details of construction without departing from the spirit and scope of the invention as defined in the claims.

What is claimed is:—

1. A variable friction gearing comprising a casing, shafts mounted in the casing, rods mounted within said shafts, cams mounted on the shafts near the opposite ends thereof, pins extending from said cams through slots in the shafts and through slots in the rod sections, elbow levers carrying rollers, one to ride on the cam and one to contact with a plate for shifting the rods, and beveled friction wheels mounted on the shafts and connected to the rods, a counter-shaft, friction wheels mounted on the counter-shaft, and a permanently rotating friction wheel on one of the shafts and on the counter-shaft.

2. In a variable friction gearing, a casing, shafts mounted in the casing on ball bearings, rods extending through said shafts, cams connected to said shafts and rods by means of pins, means for shifting said cams, elbow levers, each carrying two rollers, one to engage each of said cams and the other to engage a sectional plate, variable friction gears on said shafts, and pinned to said rods, a counter-shaft carrying friction gears, and means for reversing said shaft.

3. In a variable friction gearing, shafts, a counter-shaft, said shafts having rods extending through the same, said shafts being slotted, pins extending through said slots and connected to said rods, friction wheels connected to said pins, means for shifting the variable friction wheels into contact with coacting wheels on the counter-shaft and means for taking up the wear of the friction wheel, said means comprising adjustable ball bearing members for moving the counter-shaft relatively to the main shafts.

4. In a variable friction gear, a casing, shafts mounted in the casing, rods extending through said shafts, pins extending through said rods, friction wheels engaged by said pins, a counter shaft, friction wheels mounted on the counter shaft, and means for adjusting the counter shaft relatively to the shafts to take up the wear of the friction wheels.

5. In a variable friction gearing, the combination of a casing, shafts mounted in the casing, said shafts being mounted in alinement with each other and having ball bearings interposed between the adjacent ends thereof, rods extending through said shafts, pins extending through said rods, friction wheels engaged by said pins, a counter shaft, a series of friction wheels of variable size mounted on said counter shaft, and means for reversing the rotation of said shafts.

6. A variable friction gearing, comprising hollow shafts, rods extending through said shafts, a series of variable friction wheels, means for securing said friction wheels on said shafts and rods, means for shifting said wheels into and out of contact, means for reversing said shafts, a counter shaft, friction wheels on said counter shaft, and means for taking up the wear of said friction wheels.

In testimony whereof I affix my signature in presence of two witnesses.

THEODORE C. DU-SO.

Witnesses:
B. A. HOLLEY,
C. I. SPESSARD.

Copies of this patent may be obtained for five cents each, by addressing the "Commissioner of Patents, Washington, D. C."